F. HAINSWORTH.
APPARATUS FOR VENTILATING WATER CLOSETS.
No. 10,346. Reissued June 26, 1883.
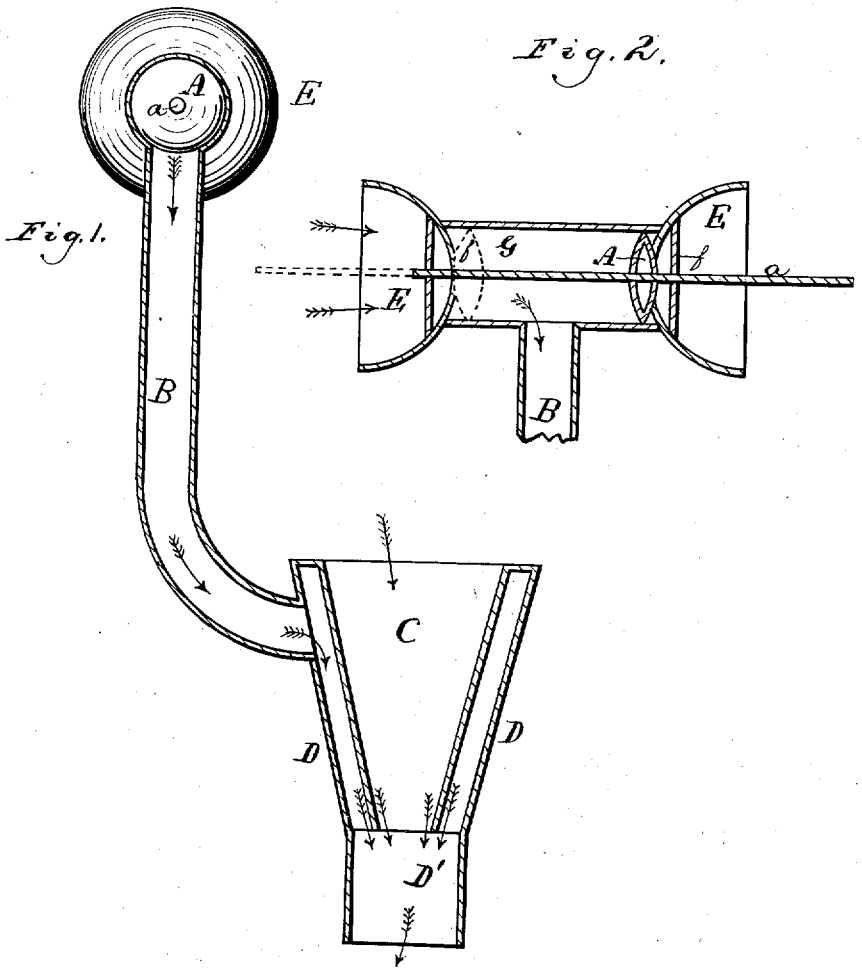
Witnesses.
J. J. Griffen
H. F. Vallette
Inventor.
F. Hainsworth
per. Jas A Cowles,
Attorney.

UNITED STATES PATENT OFFICE.

FREDERICK HAINSWORTH, OF CHICAGO, ILLINOIS.

APPARATUS FOR VENTILATING WATER-CLOSETS.

SPECIFICATION forming part of Reissued Letters Patent No. 10,346, dated June 26, 1883.

Original No. 75,010, dated March 3, 1868. Reissue No. 5,807, dated March 24, 1874. Application for reissue filed February 3, 1883.

*To all whom it may concern:*

Be it known that I, FREDERICK HAINSWORTH, of the city of Chicago, in the county of Cook and State of Illinois, have invented a new and Improved Method of Ventilating Water-Closets in Railway-Cars and Steamboats, of which the following is a specification.

Figure 1 represents a vertical section of my invention. Fig. 2 represents a longitudinal section of the upper and weather portion of my ventilating apparatus.

My invention has for its object the ventilating of water-closets used in railway-cars and steamboats in such a manner as to remove all unpleasant odors.

E E are stationary funnels at either end of the cylinder G, all of which are placed above the roof and longitudinally with the car or boat, in order that they may receive the pressure of the air caused by the motion of the car or boat.

*f f* are braces placed within the funnels, and act as supports for the rod *a*, which extends through the cylinder G. To this rod *a* the valve A is attached, which rod and valve work longitudinally in braces *f f* through cylinder G.

B is a pipe leading from the cylinder G down to the outer casing, D, which surrounds the inner shell, C, of the seat, leaving an annular space between the two.

D′ is an extension of casing D.

The momentum of the car or boat causes a pressure of air against the valve A and compels it to retreat to the rear end of cylinder G and close the opening in the rear funnel, which causes the air to pass in full force down pipe B into annular space between outer casing, D, and inner shell, C, whence it passes down and out through the extension D′. This downward course of air in pipe B causes a similar movement of air through the shell C down and through extension D′, as indicated by the arrows in Fig. 1, thus keeping the air in apartment above pure and healthful.

I claim—

A water-closet ventilator consisting of the case D, pipes B G, and valve A, as and for the purpose shown.

FREDERICK HAINSWORTH.

Witnesses:

F. J. GRIFFEN,

H. F. VALLETTE.